Figure 1:
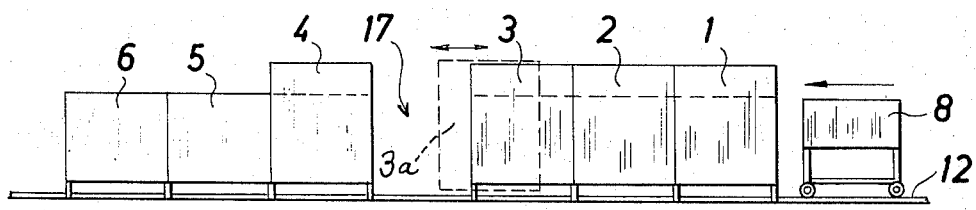

United States Patent

Artama et al.

[11] 3,762,905
[45] Oct. 2, 1973

[54] FURNACE FOR HEATING AND BENDING GLASS PLATES FOR WINDSHIELDS AND THE LIKE

[76] Inventors: Arvi Artama; Erkki Artama, both of Laukontori 4 C, Tampere, Finland

[22] Filed: Aug. 10, 1971

[21] Appl. No.: 170,547

Related U.S. Application Data

[63] Continuation-in-part of Ser. No. 64,432, Aug. 17, 1970, Pat. No. 3,697,243.

[30] Foreign Application Priority Data
Aug. 11, 1970 Finland .............................. 2196/70

[52] U.S. Cl. ..................... 65/273, 65/348
[51] Int. Cl. ............................... C03b 27/00
[58] Field of Search ..................... 65/348, 349, 350, 65/273

[56] References Cited
UNITED STATES PATENTS
2,140,282 12/1938 Drake .............................. 65/349
2,646,647 7/1953 Bamford et al. ................... 65/348 X
3,298,810 1/1967 McKelvey ......................... 65/348 X Primary Examiner—Arthur D. Kellogg
Attorney—Tab T. Thein

[57] ABSTRACT

Improved furnace for heating and bending glass plates, particularly windshields of motor vehicles, wherein the glass plates are loaded on bending forms in form carriers which are moved successively into and out of the furnace, comprising successive stationary heating and cooling chambers, including at least one preheating chamber, an adjoining main heating chamber, and at least one cooling chamber, there being formed a space between the main and the successive cooling chamber for controlling and adjusting purposes.

5 Claims, 2 Drawing Figures

PATENTED OCT 2 1973  3,762,905

FURNACE FOR HEATING AND BENDING GLASS PLATES FOR WINDSHIELDS AND THE LIKE

This is a continuation-in-part application of Ser. No. 64,342 filed Aug. 17, 1970 by Arvi Artama, titled "Furnace for Heating and Bending Glass Plates ...," on which U.S. Pat. No. 3,697,243 has been issued on Oct. 10, 1972. The earlier application relates to a furnace of the tunnel oven type, consisting of successive heating chambers through which the glass plates, placed on forms and to be bent, are made to pass in special carriages. The tunnel oven consists of a preheating chamber followed by a main heating chamber and by one or more cooling chambers. The earlier invention is characterized in that an open space is provided between two successive chambers — preferably between the preheating and the main heating chambers — so that the operator can control from there and govern the heating process in the oven.

The invention relates to an improved furnace by means of which glass plates are heated to a bending temperature while they are placed on specially designed forms or carriages where the heated glass plates are bent on account of their own weight in accordance with the shape of the bending forms. The furnace is especially intended to be used for making vehicle windshields and other glass plates having curved surfaces.

The earlier construction has however the defect that the furnace becomes very complicated and expensive because the preheating chamber must be made movable in order to have the heating succeed, in addition to the movement of one or more form carriages which are passed through the furnace.

The purpose of the present invention is to improve the furnace or heating apparatus, and the present invention is mainly characterized in that the open space between the chambers is arranged this time between the main heating chamber and the successive one of the cooling chambers.

Figure 2:
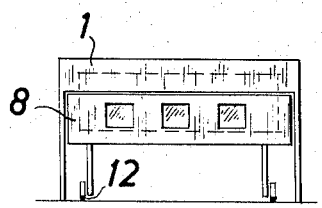

Other objects and many of the attendant advantages of the invention will be readily appreciated as the same becomes better understood by reference to the following detailed description, when considered with the accompanying drawing, wherein:

FIG. 1 is a somewhat schematic side view of an improved furnace embodiment according to the present invention; and FIG. 2 is an end view thereof.

The inventive furnace or heating apparatus consists of successive heating chambers, such as preheating chambers 1 and 2, where the preheating of the glass plates takes place, and a main heating chamber 3 where the heating to the bending temperature is performed. After softening the bending of the glass plates proceeds under their own weight into the shape of the form located in a form carriage or carrier 8 which can be moved along rails or runways 12 extending throughout the inventive furnace, by the aid of appropriate rolling means, such as wheels or rollers, as shown. The apparatus also has cooling chambers 4, 5 and 6 where the glass plates are allowed gradually to cool in successive stages.

According to this invention an open control space 17 is arranged between the heating and cooling chambers 3 and 4, respectively, thus allowing control of the procedure and adjustment of the heating to be performed from this location during the heating process. By providing the control space 17 as just described a less complicated construction of the furnace, a better possibility for adjusting the same, and a better bending performance result than could be obtained before. No part of the furnace need be made movable.

The construction of the improved furnace itself is known and has been described in the above-identified earlier application. The heating chambers have steel frames, are lined with a suitable insulation and are covered on the outside with steel plates. The chambers to be heated, namely 1, 2 and/or 3, are provided with electrical resistance elements (not shown). The temperature in the furnace chambers can easily be controlled by adjusting the electrical capacity because the parts of the furnace are designed to be manufactured so that they store as little heat as possible.

The glass plates to be heated and bent are placed on the forms located in the carriages 8 which pass through the furnace, after which the completely bent glass plates are removed from the forms and new ones are put in their place. The walls of the carriages may have windows of fireproof glass, through which the glass plates can be observed and controlled, if necessary. Such windows may also be provided in the walls of the main heating chamber 3. The carriages are transported through the furnace by a mechanism fully described in the above-mentioned application.

The control space 17 according to the present invention can also be provided with a hinged or a gliding cover, in which case the cover can be turned down or pulled over the space when it is not in use, thus preventing the loss of heat through radiation from either of the chambers 3 and 4. As a matter of example, a simple guiding cover 3a is shown in FIG. 1 (but omitted from FIG. 2).

One or more of the chambers may be provided with individually adjustable heating means, as fully described in the earlier application. At least one of the carriers being passed through the furnace may also have individually adjustable heating means.

Known program control means can also be adapted for controlling the functions of the furnace, such as for determining the heating time according to a given program, so far as this is always true for a particular glass shape. The operator in control space 17 can always control and adjust the differences and errors in the critical parameters.

It should be understood, of course, that the foregoing disclosure relates only to a preferred, exemplary embodiment of the inventive improved furnace, and that it is intended to cover all changes and modifications of the example described which do not constitute departures from the scope and spirit of the invention.

What we claim is:

1. A furnace for heating and bending glass plates, particularly windshields of motor vehicles, wherein the glass plates are loaded on bending forms in form carriers which are moved successively into and out of the furnace, comprising, in combination, successive stationary heating and cooling chambers, including at least one preheating chamber, an adjoining main heating chamber, and at least one cooling chamber, with respective heating and cooling means disposed in respective ones of said chambers, there being formed a space between said main heating chamber and the successive one of said cooling chambers for controlling and adjusting purposes, for heating the glass plates loaded on said forms in said carriers as they are successively moved through said chambers, wherein said carriers have rolling members, and further comprising a runway along and below said chambers, allowing said rolling members of the carriers to be moved therealong, in a region spaced away from the effects of said heating and said cooling means.

2. The furnace as defined in claim 1, further comprising movable cover means for said space between the main heating and the cooling chambers.

3. The furnace as defined in claim 1, further comprising individually adjustable heating means in at least the first one of said chambers, as viewed in the direction of movement of said carriers.

4. The furnace as defined in claim 1, further comprising individually adjustable heating means in at least one of said carriers.

5. The furnace as defined in claim 1, further comprising drive means for effecting the movement of said carriers.

* * * * *